(12) United States Patent
Hong et al.

(10) Patent No.: US 9,420,073 B2
(45) Date of Patent: Aug. 16, 2016

(54) VIBRATOR

(71) Applicant: SAMSUNG ELECTRO-MECHANICS CO., LTD., Suwon-si (KR)

(72) Inventors: Jong Woo Hong, Suwon-si (KR); Yun Yeong Park, Suwon-si (KR)

(73) Assignee: MPLUS CO., LTD., Suwon-Si, Gyeonggi-Do (KR)

( * ) Notice: Subject to any disclaimer, the term of this patent is extended or adjusted under 35 U.S.C. 154(b) by 306 days.

(21) Appl. No.: 14/160,413

(22) Filed: Jan. 21, 2014

(65) Prior Publication Data

US 2015/0018054 A1    Jan. 15, 2015

(30) Foreign Application Priority Data

Jul. 12, 2013  (KR) .......................... 10-2013-0082124

(51) Int. Cl.
*H02N 2/04*   (2006.01)
*H04M 1/02*   (2006.01)
*B06B 1/06*   (2006.01)

(52) U.S. Cl.
CPC .............. *H04M 1/026* (2013.01); *B06B 1/0603* (2013.01); *B06B 1/0681* (2013.01)

(58) Field of Classification Search
CPC ....... H02N 2/04; H04M 1/026; B60B 1/0603; B60B 1/0681

USPC .............................................. 73/662; 310/345
See application file for complete search history.

(56) References Cited

U.S. PATENT DOCUMENTS

| | | | | |
|---|---|---|---|---|
| 2011/0241488 | A1* | 10/2011 | Kimura ................ | H02N 2/0015 310/323.16 |
| 2012/0212100 | A1* | 8/2012 | Lee ........................ | H01L 41/053 310/317 |
| 2013/0300256 | A1* | 11/2013 | Kim ........................ | H03H 9/09 310/326 |
| 2014/0191691 | A1* | 7/2014 | Kudo ................... | H02N 2/0015 318/116 |
| 2015/0084485 | A1* | 3/2015 | Oh ........................ | B06B 1/0648 310/345 |

FOREIGN PATENT DOCUMENTS

JP    2009-10864 A    1/2009
KR   10-1157868 B1   6/2012

* cited by examiner

*Primary Examiner* — Laura Martin
*Assistant Examiner* — Rose M Miller
(74) *Attorney, Agent, or Firm* — LRK Patent Law Firm

(57) ABSTRACT

There is provided a vibrator including: a housing having an internal space and having at least one through-hole formed therein; a vibrator disposed in the housing and vibrating; and an impact damping member installed on at least one of outer surfaces of the housing and damping impact, wherein the vibrator has protrusions disposed thereon so as to correspond to the through-hole and contacting the impact damping member while penetrating the through-hole at the time of external impact.

10 Claims, 4 Drawing Sheets

VIBRATOR

CROSS-REFERENCE TO RELATED APPLICATION

This application claims the benefit of Korean Patent Application No. 10-2013-0082124 filed on Jul. 12, 2013, with the Korean Intellectual Property Office, the disclosure of which is incorporated in its entirety herein by reference.

BACKGROUND

The present disclosure relates to a vibrator.

A vibrator, a component converting electric energy into mechanical vibration using a principle of generating electromagnetic force, is mounted in mobile phones to be used for silently notifying a user of call reception by transferring vibration to the user.

Meanwhile, in accordance with the rapid growth of mobile phone market and the trend toward addition of multiple functions to the mobile phone, mobile phone components have been required to have a small size and high quality. In this situation, demand has increased for development of a vibrator having a new structure capable of overcoming disadvantages of an existing vibrator and significantly improving quality.

In addition, as the release of smart phones among mobile phones has rapidly increased, a touch screen scheme has been adopted, such that the vibrator has been used in order to generate vibration at the time of touching a touch screen.

Performances particularly required in the vibration generated at the time of touching the touch screen are as follows. First, since the number of vibration generation at the time of touching the touch screen is larger than that of vibration generation at the time of call reception, an operation lifespan should increase. Second, in order to increase user satisfaction when a user feels the vibration at the time of touching the touch screen, a response speed of the vibration should increase in accordance with a touch speed of the touch screen.

In addition, a piezo haptic actuator has been used as a product capable of implementing these performances. The piezo haptic actuator uses the principle of inverse piezoelectric effect from which displacement is generated when a voltage is applied to a piezo-element, that is, a principle of allowing a weight of a mover to be moved by the generated displacement to generate a vibration force.

A vibrator having the above-mentioned structure has the following features. A bandwidth of a frequency capable of obtaining a vibration force at or above a predetermined level is wide, such that stable vibration characteristics may be implemented, and vibration having low and high frequencies rather than a single frequency in a predetermined frequency range may be variously used. In addition, since the vibrator may implement rapid operation response characteristics, it may be appropriate for implementing haptic vibration of a mobile device such as a mobile phone, or the like.

Meanwhile, the piezo-element generally has a hexahedral shape in which a length thereof is larger than a width thereof. In this case, since the length of the piezo-element should be long in order to secure displacement and vibration, an entire length of the vibrator increases and the piezo-element becomes vulnerable to drop impact.

In order to prevent damage to the piezo-element, a plurality of damper members has been installed in the mover and a housing.

However, in this case, vibration force generated by the mover decreases and a resonance frequency increases.

Further, an internal space becomes narrower due to the damper members, such that it is difficult to secure sufficient vibration force.

RELATED ART DOCUMENT (Patent Document 1) Korean Patent No. 1157868

SUMMARY

An aspect of the present disclosure may provide a vibrator capable of suppressing a decrease in vibration force while simultaneously decreasing damage due to external impact.

According to an aspect of the present disclosure, a vibrator may include: a housing having an internal space and having at least one through-hole formed therein; a vibrator disposed in the housing and vibrating; and an impact damping member installed on at least one of outer surfaces of the housing and damping impact, wherein the vibrator has protrusions disposed thereon so as to correspond to the through-hole and contacting the impact damping member while penetrating the through-hole at the time of external impact.

The impact damping member may be installed on at least one of upper and lower surfaces of the housing, and a plurality of through-holes may be formed in at least one of the upper and lower surfaces of the housing.

The impact damping member may be formed of an elastic and waterproof material.

According to another aspect of the present disclosure, a vibrator may include: a housing having an internal space and having a plurality of through-holes formed therein; an elastic member having both end portions fixed to the housing; a piezoelectric element installed on the elastic member and deforming in the case in which power is applied thereto; a weight body connected to the elastic member and amplifying vibration generated by deformation of the piezoelectric element; and an impact damping member installed on at least one of outer surfaces of the housing, wherein at least one of the weight body and the elastic member has protrusions disposed thereon so as to correspond to the through-holes and contacting the impact damping member while penetrating the through-holes at the time of external impact.

The impact damping member may be installed on at least one of upper and lower surfaces of the housing, and a plurality of through-holes may be formed in at least one of the upper and lower surfaces of the housing.

A plurality of protrusions may be disposed on an upper surface of the weight body in a length direction of the housing so as to be spaced apart from each other, the through-holes may be formed in an upper surface of the housing so as to correspond to the protrusions, and the impact damping member may be installed on the upper surface of the housing and contact the protrusions formed on the weight body at the time of the external impact.

The protrusions may be formed on a lower surface of the elastic member and be disposed adjacent to both end portions of the elastic member, the through-holes may be formed in a lower surface of the housing so as to correspond to the protrusions, and the impact damping member may be installed on the lower surface of the housing and contact the protrusions formed on the lower surface of the elastic member at the time of the external impact.

The impact damping member may have a size at which it covers an entire region of an upper surface or a lower surface of the housing.

The through hole may be larger than the protrusion.

The protrusion may have a thickness at which it does not contact the impact damping member when the elastic member operates normally.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
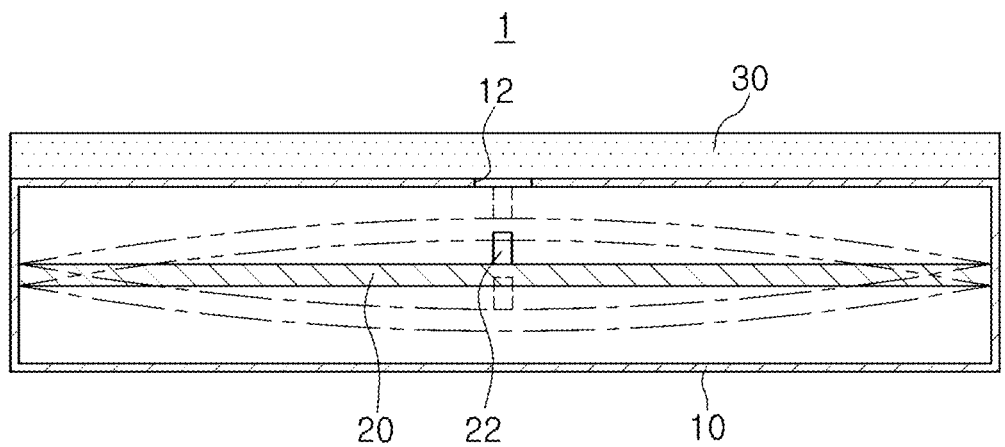
FIGS. 1 and 2 are schematic configuration diagrams illustrating a vibrator according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 2:
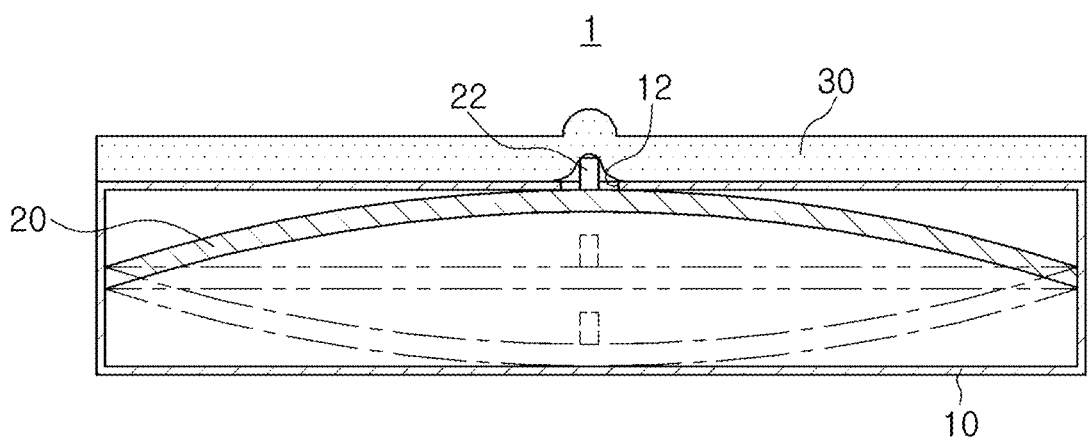

FIGS. 1 and 2 are schematic configuration diagrams illustrating a vibrator according to an exemplary embodiment of the present disclosure.

Meanwhile, FIGS. 1 and 2, which are views for schematically describing a technical spirit of a vibrator according to an exemplary embodiment of the present disclosure, schematically show components included in the vibrator.

First, a technical spirit of a vibrator according to an exemplary embodiment of the present disclosure will be described with reference to FIGS. 1 and 2.

A vibrator 1 according to an exemplary embodiment of the present disclosure may include a housing 10, a vibrator 20, and an impact damping member 30 by way of example.

The housing 10 may have an internal space and may have various shapes such as a cube shape, a hexahedral shape, a coin shape, or the like.

In other words, the housing 10 may have any shape containing the internal space.

Meanwhile, the housing 10 may have at least one through-hole 12 formed therein. Although the case in which a single through-hole 12 is formed has been described by way of example in the exemplary embodiment, the present disclosure is not limited thereto. That is, a plurality of through-holes 12 may also be formed.

The vibrator 20 may be disposed and vibrate in the housing 10. That is, the vibrator 20, which converts electric energy into mechanical energy when power is supplied thereto, may vibrate in the housing 10.

Although the case in which both end portions of the vibrator 20 are fixed to the housing 10 has been described by way of example in FIGS. 1 and 2, the present disclosure is not limited thereto. That is, the vibrator 20 may vibrate with at least a portion (for example, one end portion) thereof fixed to the housing 10.

Meanwhile, the vibrator 20 may have a protrusion 22 disposed thereon corresponding to the through-hole 12 and contacting the impact damping member 30 while penetrating through the through-hole 12 when there is external impact.

In addition, the through-hole 12 may be larger than the protrusion 22 so that the protrusion 22 may smoothly penetrate therethrough when there is external impact.

Further, the protrusion 22 may have various shapes. That is, the protrusion 22 may have various shapes such as a cylindrical shape, a square pillar shape, and the like.

Meanwhile, the protrusion 22 may have a thickness at which it may not contact the impact damping member 30 when the vibrator 20 operates normally. That is, the protrusion 22 may have a thickness at which it may contact the impact damping member 30 while penetrating through the through-hole 12 in the case in which the vibrator 20 vibrates abnormally due to the external impact.

The impact damping member 30 may be installed on at least one of outer surfaces of the housing 10 and damp the impact when the external impact is generated.

Meanwhile, the impact damping member 30 may be installed on at least one of upper and lower surfaces of the housing 10, and at least one through-hole 12 may be formed in the at least one of the upper and lower surfaces of the housing 10.

In addition, the impact damping member 30 may be formed of an elastic and waterproof material.

Although the case in which the impact damping member 30 is installed on the upper surface of the housing 10 has been shown by way of example in FIGS. 1 and 2, the present disclosure is not limited thereto.

As described above, the impact damping member 30 may be formed on the outer surface of the housing 10, and the protrusion 22 formed on the vibrator 20 may contact the impact damping member 30 upon external impact, thereby damping the external impact.

As described above, the external impact may be damped by the impact damping member 30 installed on the outer surface of the housing 10 and the protrusion 22 of the vibrator 22, such that damage to the vibrator 20 may be decreased.

Meanwhile, in the related art, a damper member was installed on an inner surface of the vibrator 20 or the housing 10, such that a structure is complicated and the damper member contacts other components at the time of normal operation, such that the vibrator vibrates abnormally. However, according to an exemplary embodiment of the present disclosure, the above-mentioned problem may be solved by installing the impact damping member 30 on the outer surface of the housing 10 as described above.

Further, since the damper member may not be installed on the vibrator 20, a decrease in the amount of vibration due to the damper member may be suppressed, and a resonance frequency may be decreased.

In addition, the vibrator may be miniaturized by omitting the damper member.

Further, since the resonance frequency may be decreased, a thickness of a component configuring the vibrator may be increased to lengthen a lifespan of the vibrator.

In addition, a decrease in the lifespan of the vibrator may be suppressed even in a warm and wet environment due to the impact damping member 30 formed of the waterproof material.

Further, since the impact damping member 30 is installed on the outer surface of the housing 10, the impact damping member 30 itself may serve to protect the housing 10 from the external impact.

Meanwhile, although the case in which the impact damping member 30 is installed on the upper surface of the housing 10 has been described above by way of example, the present disclosure is not limited thereto. That is, the impact damping member 30 may be installed on at least one of the upper surface, lower surface, side surface, and both end surfaces of the housing 10.

Hereinafter, a specific application of the vibrator according to an exemplary embodiment of the present disclosure will be described with reference to the accompanying drawings.

Figure 3:
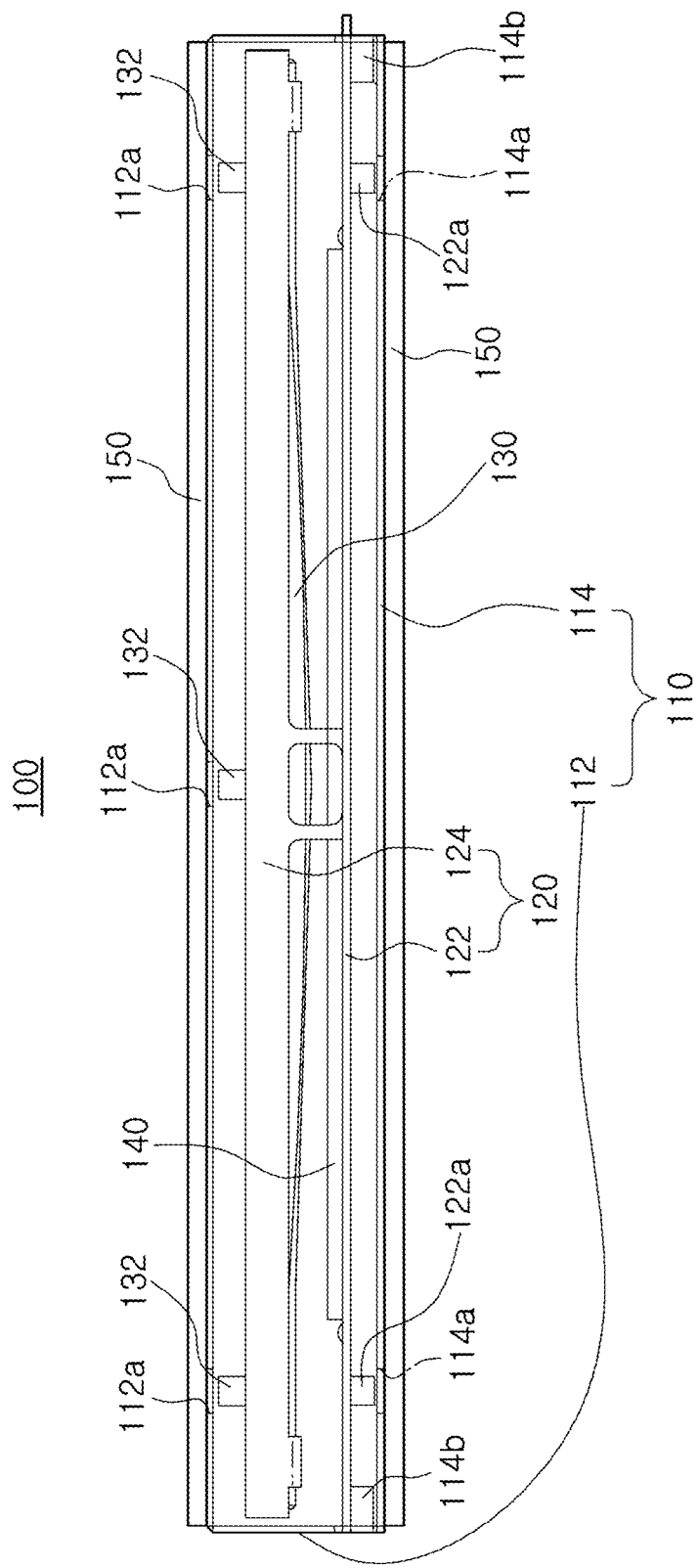
FIG. 3 is a cross-sectional view illustrating a specific application of the vibrator according to an exemplary embodiment of the present disclosure.
Figure 4:
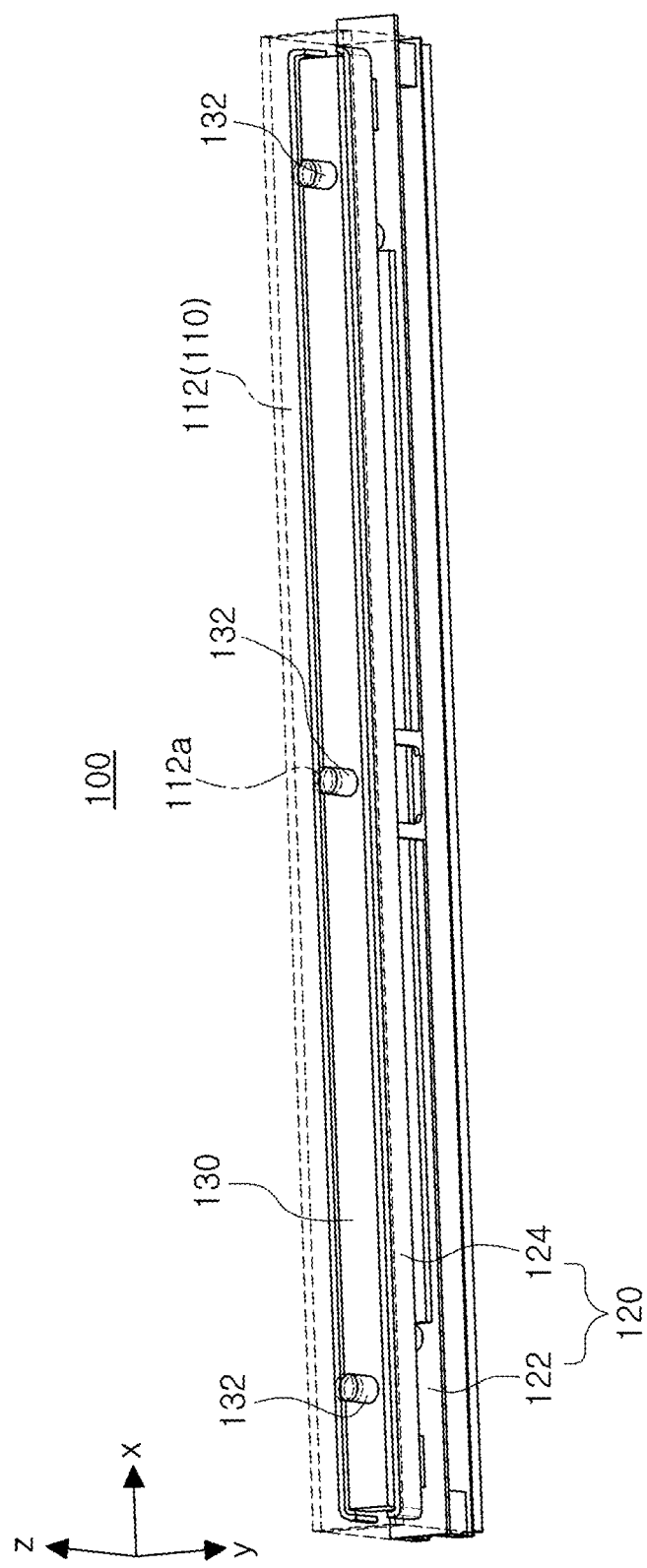
FIG. 4 is an internal configuration diagram illustrating a specific application of the vibrator according to an exemplary embodiment of the present disclosure.

FIG. 3 is a cross-sectional view illustrating a specific application of the vibrator according to an exemplary embodiment of the present disclosure and FIG. 4 is an internal configuration diagram illustrating a specific application of the vibrator according to an exemplary embodiment of the present disclosure.

Referring to FIGS. 3 and 4, a vibrator 100 may include a housing 110, an elastic member 120, a weight body 130, a piezoelectric element 140, and an impact damping member 150 by way of example.

The housing 110 may have an internal space and include one or more through-holes 112a and 114a. Meanwhile, the housing 110 may include an upper case 112 and a bracket 114.

The upper case 112 may have a box shape in which a lower portion thereof is opened and may have an internal space. That is, the upper case 112 may have a box shape such as a hexahedral shape and have the bracket 114 assembled to a lower end portion thereof.

In addition, the upper case 112 may have the through-holes 112a formed in an upper surface thereof. A plurality of through-holes 112a may be disposed in a length direction of the upper case 112 so as to be spaced apart from each other.

Here, terms with respect to directions will be defined. As seen in FIG. 4, a length direction refers to an X direction, a width direction refers to a Y direction, and a thickness direction refers to a Z direction.

The bracket 114 may have a plate shape and may include support parts 114b formed at both end portions thereof in order to support the elastic member 120. Meanwhile, the bracket 114 may also have the through-holes 114a formed therein. A plurality of through-holes 114a may be disposed in a length direction of the bracket 114 so as to be spaced apart from each other.

Meanwhile, the through-holes 114a may be disposed adjacent to the support parts 114b of the bracket 114. In other words, the through-holes 114a may be disposed adjacent to both end portions of the bracket 114.

The elastic member 120 may have both end portions thereof fixed to the support parts 114b. That is, both end portions of the elastic member 120 may be supported by the support parts 114b of the bracket 114.

Meanwhile, the elastic member 120 may include a plate part 122 having a plate shape and an extension part 124 extended from both sides of the plate part 122.

The plate part 122 may have both end portions supported by the support parts 114b and may vertically vibrate by deformation of the piezoelectric element 140 when power is supplied thereto. In other words, the plate part 122 may vibrate in the Z direction by the deformation of the piezoelectric element 140.

In addition, the plate part 122 may be provided with protrusions 122a corresponding to the through-holes 114a of the bracket 114. The protrusions 122a may have a thickness at which they do not contact the impact damping member 150 in the case in which the plate part 122 vibrates normally.

In addition, the protrusions 122a may contact the impact damping member 150 while penetrating through the through-holes 114a in the case in which external impact is applied to the vibrator. Therefore, a transfer of impact due to the external impact to the piezoelectric element 140 may be decreased.

In addition, the protrusions 122a may be formed on a lower surface of the plate part 122 and may be disposed adjacent to both end portions of the plate part 122. Further, the protrusion 122a may have a shape corresponding to a shape of the through-hole 114a. For example, the protrusion 22 may have a cylindrical shape.

Meanwhile, the extension part 124 is intended to support both sides of the weight body 130, and may have a shape corresponding to that of the weight body 130.

However, the shape of the extension part 124 may be variously changed.

The weight body 130 may have both sides supported by the extension part 124 of the elastic member 120. That is, both sides of the weight body 130 may be supported by the extension parts 124, such that the weight body 130 vibrates together with the elastic member 120 when the elastic member 120 vibrates.

The weight body 130 may serve to amplify vibration of the elastic member 120 and may be formed of tungsten.

Meanwhile, the weight body 130 may have a shape corresponding to that of the extension part 124. Therefore, the weight body 130 may be more stably supported by the extension part 124.

In addition, the weight body 130 and the elastic member 120 may configure the vibrator 20 (See FIG. 1) generating vibration by the deformation of the piezoelectric element 140, and the weight body 130 and the elastic member 120 may vibrate together depending on the deformation of the piezoelectric element 140. Meanwhile, the vibrator 20 may include the piezoelectric element 140.

Meanwhile, the weight body 130 may have protrusions 132 formed on an upper surface thereof corresponding to the through-holes 112a formed in the upper case 112. A plurality of protrusions 132 may be disposed in the length direction of the upper case 112 so as to be spaced apart from each other.

Although the case in which the number of protrusions 132 is three has been described in the exemplary embodiment, the present disclosure is not limited thereto. That is, the number of protrusions 132 may be one, two, or four or more.

In addition, the protrusion 132 formed on the weight body 130 may also have a cylindrical shape. However, since a shape of the protrusion 132 may correspond to that of the through-hole 112a, it may be variously changed.

In addition, the protrusions 132 may have a thickness at which they do not contact the impact damping member 150 in the case in which the elastic member 120 operates normally and may contact the impact damping member 150 while penetrating through the through-holes 112a in the case in which the elastic member 120 vibrates abnormally at the time of generation of the external impact.

The piezoelectric element 140 may have, for example, a hexahedral shape. Meanwhile, the piezoelectric element 140 may be deformed in the length direction in the case in which the power is applied thereto, thereby vibrating the elastic member 120.

To this end, the piezoelectric element 140 may be fixed to at least one of upper and lower surfaces of the elastic member 120.

That is, when the power is applied to the piezoelectric element 140, the piezoelectric element 140 may be deformed in the length direction. Therefore, the plate part 122 of the elastic member 120 on which the piezoelectric element 140 is installed may vibrate in the thickness direction.

In addition, the weight body 130 may also vibrate along with the plate part 122 due to the vibration of the plate part 122.

The impact damping member 150 may be installed on at least one of outer surfaces of the housing 110 and damp the external impact when the external impact occurs.

For example, the impact damping member 150 may be installed on at least one of upper and lower surfaces of the housing 110.

Meanwhile, although the case in which the impact damping members 150 are installed on an upper surface of the upper case 112 and a lower surface of the bracket 114 has been described by way of example in the exemplary embodiment, the present disclosure is not limited thereto. That is, the impact damping members 150 may also be formed on a side surface and both end surfaces of the housing 110 among outer surfaces of the housing 110.

In addition, the impact damping member 150 may be formed of an elastic and waterproof material.

Further, the impact damping member 150 may have a size at which it may cover an entire region of the upper surface of the upper case 112 or the lower surface of the bracket 114. However, the present disclosure is not limited thereto. That is, the impact damping member 150 may also have a size at which it may cover the through-hole 112a or 114a.

As described above, the protrusions 122a and 132 installed on the elastic member 120 and the weight body 130, respectively, may contact the impact damping members 150 installed on the outer surfaces of the housing 110 upon external impact, thereby decreasing the degree of impact sustained from the external impact.

Therefore, the amount of impact transferred to the piezoelectric element 140 may be decreased to decrease damage to the piezoelectric element 140.

In addition, since a damper member installed in the housing 110 in the related art may be omitted, an internal structure of the housing 110 may be simplified.

Therefore, a contact between the damper member and components disposed in the housing 110 at the time of a normal operation may be prevented, and generation of abnormal vibration by the vibrator 20 (See FIG. 1) caused by the contact may be prevented.

Further, since the damper member may be omitted, a decrease in the amount of vibration by the damper member may be suppressed, and a resonance frequency may be decreased.

That is, in the case in which the damper member is installed on the vibrator, the amount of vibration may be decreased by the damper member and the resonance frequency may be increased. However, as described above, the impact damping members 150 may be installed on the outer surfaces of the housing 110 to suppress the decrease in the amount of vibration and decrease the resonance frequency.

In addition, the vibrator may be miniaturized by omitting the damper member.

Also, since the resonance frequency may be deceased, a thickness of the plate part 122 of the elastic member 120 may be increased, such that a lifespan of the vibrator 100 may be increased.

Further, in the case in which the impact damping members 150 are formed of the waterproof material, moisture may not be introduced into the housing 110 even in a warm and wet environment, such that a lifespan of the vibrator 100 may be further increased.

In addition, since the impact damping members 150 are installed on the outer surfaces of the housing 110, the impact damping member 150 itself may serve to protect the housing 110 from the external impact.

Meanwhile, although the case in which the impact damping members 150 are installed on the upper surface and the lower surface of the housing 110 has been described above by way of example, the present disclosure is not limited thereto. That is, the impact damping members 150 may also be installed on and the side surface and both end surfaces of the housing 110. In this case, the protrusions may also be formed on surfaces facing the side surface and/or both end surfaces of the housing 110.

Figure 5:
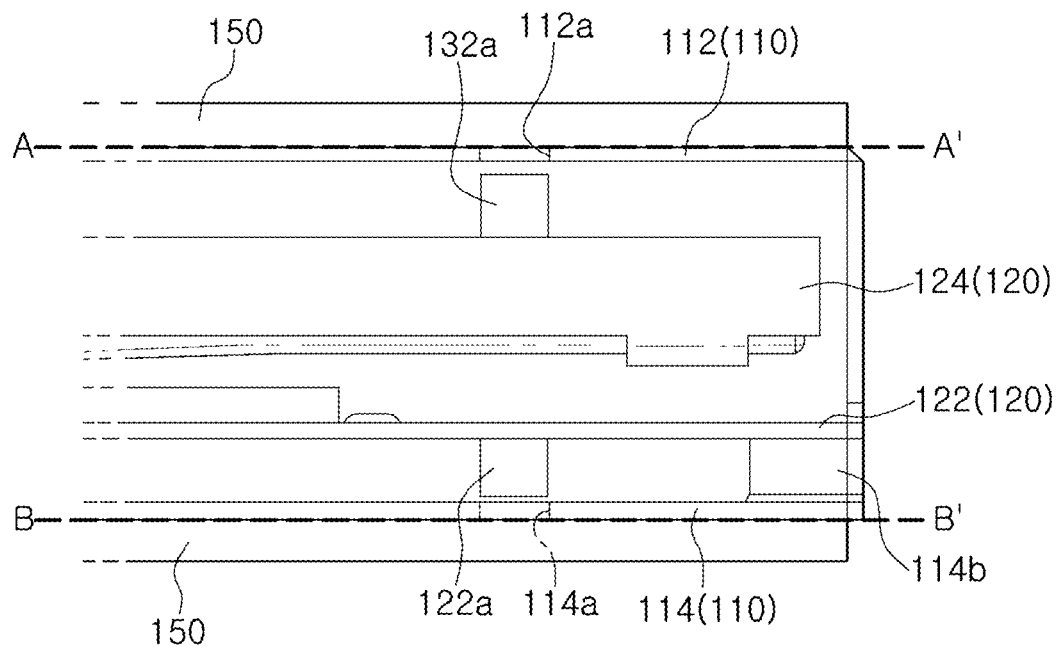
FIGS. 5 and 6 are views for describing an operation of the specific application of the vibrator according to an exemplary embodiment of the present disclosure.
Figure 6:
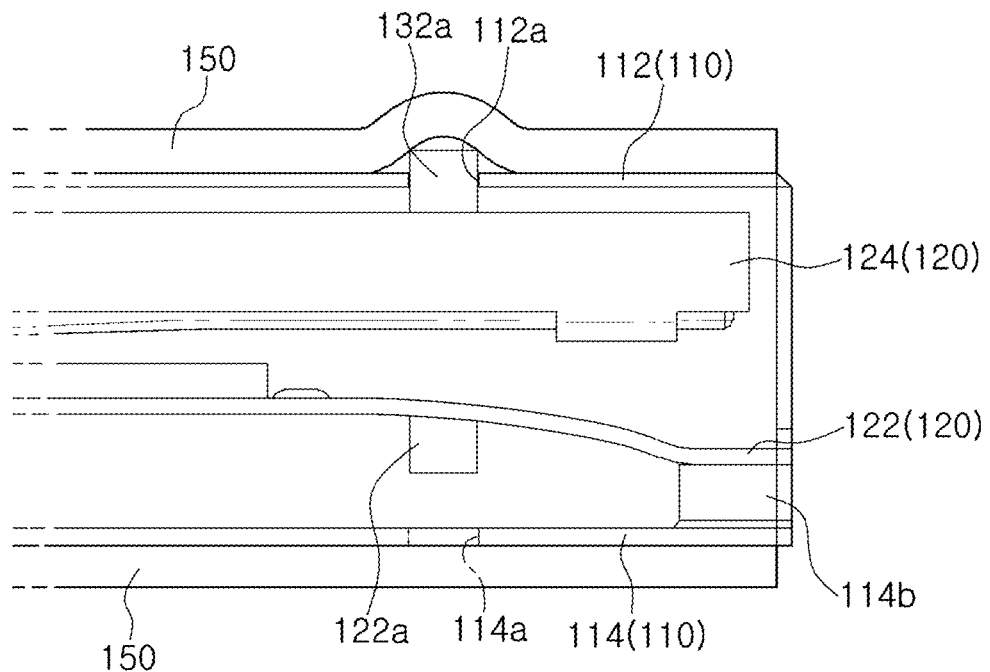

FIGS. 5 and 6 are views for describing an operation of the specific application of the vibrator according to an exemplary embodiment of the present disclosure.

First, referring to FIG. 5, when the vibrator 100 operates normally, the protrusions 122a and 132 may be disposed the internal space of the housing 110. That is, the protrusions 122a and 132 may be inserted into the through-holes 114a and 112a, respectively, so as to not cross line A-A' and line B-B shown in FIG. 5, respectively. However, when the vibrator 100 operates normally, the protrusions 122a and 132 may not contact the impact damping members 150.

Then, as shown in FIG. 6, when the external impact is applied to the vibrator 100, the protrusions 122a and 132 may contact the impact damping members 150 installed on the outer surface of the housing 110 while penetrating through the through-holes 114a and 112a, respectively.

As described above, the protrusions 122a and 132 may contact the impact damping members 150 when there is external impact, such that the degree of impact may be decreased, thereby decreasing damage to the piezoelectric element 140.

As set forth above, according to exemplary embodiments of the present disclosure, external impact may be damped by an impact damping member installed on an outer surface of the housing and protrusions formed on a vibrator to decrease damage and suppress a decrease in vibration force due to internal interference.

While exemplary embodiments have been shown and described above, it will be apparent to those skilled in the art that modifications and variations could be made without departing from the spirit and scope of the present disclosure as defined by the appended claims.

What is claimed is:

1. A vibrator, comprising:
   a housing having an internal space and having at least one through-hole formed therein;
   a vibrator disposed in the housing; and
   an impact damping member installed on at least one of outer surfaces of the housing,
   wherein the vibrator has at least one protrusion disposed thereon so as to correspond to each of the through-holes, and
   wherein the protrusions are configured to contact the impact damping member while penetrating the through-holes at a time of external impact.

2. The vibrator of claim 1, wherein the impact damping member is installed on at least one of upper and lower surfaces of the housing, and the through-holes are formed in at least one of the upper and lower surfaces of the housing, where the damping is installed.

3. The vibrator of claim 1, wherein the impact damping member is formed of an elastic and waterproof material.

4. A vibrator comprising:

a housing having an internal space and having a plurality of through-holes formed therein;

an elastic member having both end portions fixed to the housing;

a piezoelectric element installed on the elastic member, the piezoelectric element configured to deform in the case in which power is applied thereto;

a weight body connected to the elastic member, the weight body configured to amplify vibration generated by deformation of the piezoelectric element; and an impact damping member installed on at least one of outer surfaces of the housing, wherein at least one of the weight body and the elastic member has a plurality of protrusions disposed thereon so as to correspond to the through-holes, and wherein the protrusions are configured to contact the impact damping member while penetrating the through-holes at a time of external impact.

5. The vibrator of claim 4, wherein the impact damping member is installed on at least one of upper and lower surfaces of the housing, and the through-holes are formed in at least one of the upper and lower surfaces of the housing, where the damping member is installed.

6. The vibrator of claim 4, wherein the protrusions are disposed on an upper surface of the weight body in a length direction of the housing so as to be spaced apart from each other, the through-holes are formed in an upper surface of the housing so as to correspond to the protrusions, and the impact damping member is installed on the upper surface of the housing and contacts the protrusions formed on the weight body at the time of the external impact.

7. The vibrator of claim 4, wherein the protrusions are formed on a lower surface of the elastic member and are disposed adjacent to both end portions of the elastic member, the through-holes are formed in a lower surface of the housing so as to correspond to the protrusions, and the impact damping member is installed on the lower surface of the housing and contacts the protrusions formed on the lower surface of the elastic member at the time of the external impact.

8. The vibrator of claim 4, wherein the impact damping member has a size at which it covers an entire region of an upper surface or a lower surface of the housing.

9. The vibrator of claim 4, wherein each of the through-holes is larger than each of the corresponding protrusions.

10. The vibrator of claim 4, wherein each of the protrusions has a thicknesses at which it does not contact the impact damping member when the elastic member operates normally.

* * * * *